(12) United States Patent
Conley

(10) Patent No.: US 6,373,636 B1
(45) Date of Patent: Apr. 16, 2002

(54) HEAT STABILIZED AND DIMENSIONALLY STABLE THIN LENTICULAR FILM

(76) Inventor: Kenneth E. Conley, 3308 Mikelynn La., Matthews, NC (US) 28105

( * ) Notice: Subject to any disclaimer, the term of this patent is extended or adjusted under 35 U.S.C. 154(b) by 63 days.

(21) Appl. No.: 09/657,831

(22) Filed: Sep. 8, 2000

(51) Int. Cl.[7] .......................... G02B 27/10; B41M 3/12; B32B 3/00
(52) U.S. Cl. ...................... 359/619; 427/146; 427/148; 428/172
(58) Field of Search .................. 359/619, 628, 359/630; 427/146, 148, 255.6; 428/172

(56) References Cited

U.S. PATENT DOCUMENTS 4,420,502 A  * 12/1983 Conley ...................... 427/54.1
4,420,527 A  * 12/1983 Conley ........................ 428/172
5,236,739 A  *  8/1993 Chou et al. .................. 427/146

* cited by examiner

Primary Examiner—Jordon Schwartz
Assistant Examiner—Tim Thompson
(74) Attorney, Agent, or Firm—Dougherty & Clements LLP

(57) ABSTRACT

A method for producing an anisotropic optical device that enables the viewer to perceive a repertoire of preselected images over a first range of angles of regard in previously unachievably thin anisotropic sheets. The device, which is useful as advertising media in a wide variety of forms, includes a bilaterally stabilized base film layer, a molded lenticular surface having lenses with substantially circular cross section adhesively affixed to a first side of the base film; and a computer-generated image that is registered to the lenticular surface and affixed to the second side of the bilaterally stabilized base film.

45 Claims, 10 Drawing Sheets

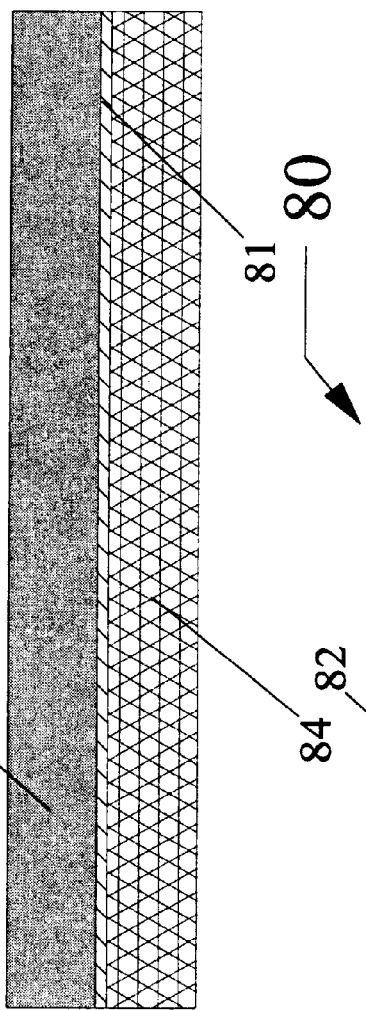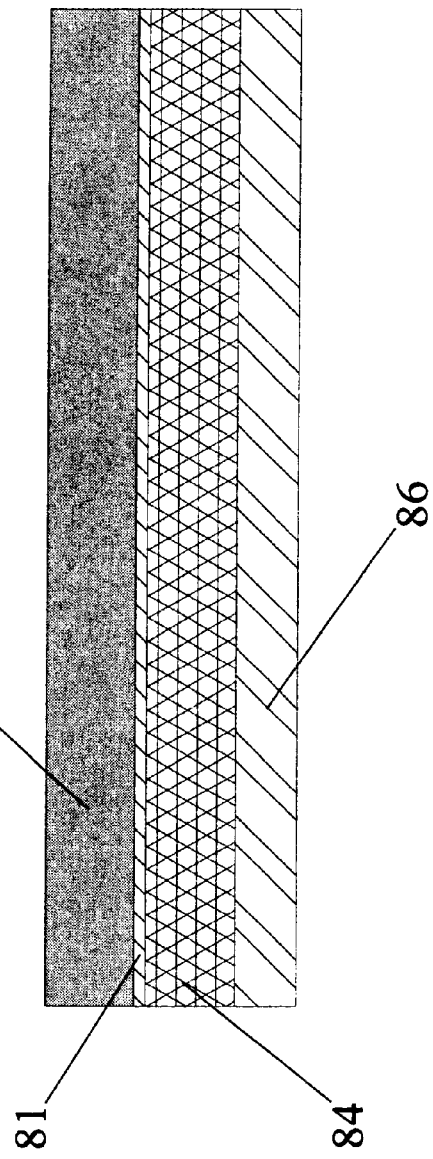

HEAT STABILIZED AND DIMENSIONALLY STABLE THIN LENTICULAR FILM

FIELD OF THE INVENTION

The present invention relates to optical devices wherein the image seen by a viewer depends on the viewer's angle of regard with respect to the plane of the windowpane-shaped device. More particularly, the invention relates to an extraordinarily thin lenticular sheet with periodic optical elements formed in such a way that the viewer will perceive a series of images that change depending on the viewer's angle of regard. The invention presents an improved manufacturing technique for such sheets that overcome the unsatisfactory results achieved in dimensional tolerance and stability with current methods applied to fine dimensions.

DESCRIPTION OF RELATED ART

The concern of this patent is very thin lenticular sheets wherein the finished product is of comparable overall thickness to 10 to 24-lb bond paper. Thus, the product can be used for magazine blow-ins or pages in magazines that use perfect bindings. It can be used in many other special applications that have heretofore been unattainable due the relatively stiff nature of the lenticular product. For example, a sufficiently thin lenticular film can be used to decorate a tee-shirt, or be incorporated any imaginable place where paper-thin products might be used.

A lens array is fabricated by first designing a cutting tool with the desired lens shape, then using this tool to cut the negative of the shape of the array of lenses into a cylindrical roll. A lenticular plastic sheet is usually produced by the extrusion of a single layer from a thermoplastic resin melt into a continuous web. The extrusion equipment consists of a die, followed by a roll stack whereby the lens pattern on the cylinder is pressed into the viscous resin using an embossing roll with counter pressure being provided by a nip roll. In manufacturing plants today, the lens array is almost always produced by molding the appropriate shape into the surface. Cross-linking of the thermoplastic is enabled thermally in the extrusion process. Cooling the thermoplastic lenticular resin sets the relief pattern on the surface. In some cases, actinic radiation, usually in the form of ultraviolet light of appropriate wavelength and radiance is used to cross link said resin and thereby set the relief pattern.

To get said thermoplastic web in condition to be divided into sheets or readied for shipment on a take-spool, pull-rolls are used to draw the substantially cooled and set material. These rolls unavoidably introduce longitudinal tension into the web. Longitudinal tension is tension in the machine direction. This tensioning sometimes causes significant stretching and necking of a thin web causing the lenticular surface to distort. The distortion is not uniform. The lens pattern departs from design increasingly from the center of the web outward. The distortion is only approximately predictable. The tension can vary. Dimensions can shift when the web is divided into sheets. Temperature variability induces distortion variability. Some newly formed thermoplastics are hygroscopic and ambient humidity induces distortion variability. Attempts at introducing windage based on distortion data from a specific extrusion plant and material ameliorate the distortion somewhat. However, this solution is increasingly inadequate for increasingly thin end material. For the objectives of this patent, these effects are paramount. For thin sheets (0.012-inches to 0.002-inches thick), the aforementioned dimensional stability problems can result in an unacceptable product. The required linear registration can be problematic or impossible.

It is important to put the lenticular sheet in context of the end product. A computer-generated image is printed on the planar side of the product. The printing can be direct or a print can be prepared in a separate operation and laminated to the lenticular sheet. Either way, the print is registered and precisely aligned to the front-side lenticular array that consists of a set of parallel, longitudinal, cylindrical elements that are substantially circular in cross section. If the lenses run up and down, three-dimensional images, that is, multiple images at apparently different distances from the eyes in space, can be designed. These images are not continuous like holograms, but are convincing. For example, one image may occlude another on a "deeper" plane. The viewer can shift their angle of regard right or left and the previously occluded image will appear. If the lenses are horizontal, other interesting optical effects called flip, morph, motion, zoom and others are possible. Typically, a repertoire of two to eight images is dissected and affixed in a precisely aligned and registered fashion to said lenticular array.

If extremely thin products were not a concern, the image may be affixed in a number of ways. A registration mark is molded into the lenticular array. Since the array consists of linear parallel lenses, only one alignment mark is needed, the array itself provides the angular reference from that mark. The image can be printed on paper by almost any high-resolution printing technique. The paper can be aligned to the previously mentioned mark and laminated to lenticular away. Since our final product thickness is comparable to a sheet of paper, this technique is not available. The precision of the printing is critical. The array thickness is related to the lens spacing. A rule-of-thumb is that the overall thickness must be the lens spacing, D, times $n/2n(n-1)$ where n is the index of refraction of the material. Since the instant invention seek sicknesses on the order of 0.002-inches, the lens spacing is unavoidably on the order of 0.005-inches. The printer image technology must be at least five times more accurate than the lens spacing, on the order of 1000 lines per inch or more. The alignment must be on the order of 0.0005-inches and the orthogonality within a small fraction of a degree. Several suitable technologies are based on photolithographic printing and thermal or piezoelectric ink jet printing which are conventional except for the alignment means. With advances in photolithographic techniques driven by the semiconductor industry's pursuit of Moore's law, it is and likely will continue to be the highest resolution printing technique. The actual implementation of photolithographic printing may involve precision printing on a transfer roll and transfer printing on the end product. Despite assertions to the contrary, intaglio printing such as gravure printing wherein Cyan, Yellow, Magenta and Black inks are placed in a series of steps and thus require four precision alignments and registrations are generally applicable to lower resolution and therefore thicker embodiments of lenticular products. Due to the resolution of the eye, there is little discernable difference between 600 and 1200 pixels per inch when viewed at 15 to 18-inches. However, each repertoire image must exist at each lens crossing. To achieve eight images at an effective resolution of 600 pixels per inch requires 4800 sub pixels per inch, since the lens selects only an eighth of the underlying print at any specific angle of regard. The print resolution is therefore determined by the thickness objectives.

We are aware of the following related art:

| U.S. Pat. No. | Year | Inventor | Name |
|---|---|---|---|
| 4,420,502 | 1983 | Conley | Apparatus and Method for Producing a Flexible Sheet Material having a Predetermined Surface Characteristic |
| 4,420,527 | 1983 | Conley | Thermoset Relief Patterned Sheet |
| 4,414,316 | 1983 | Conley | Composite Lenticular Screen Sheet |
| 5,362,351 | 1994 | Karszes | Method of Making Lenticular Plastics and Products therefrom |
| 4,042,569 | 1977 | Bell et al. | Heat-setting process for polyester film |

The teachings of U.S. Pat. No. 4,420,502 ('502) differ from the currently used manufacturing technique in that a base film that is intended to be dimensionally invariant covers the nip roll while a lenticular resin is extruded between the molding roll and the nip roll. In a first embodiment, the base film is incorporated into the product, thus would either receive print directly or have an image that is printed on paper bonded to it. The base film incorporates adhesion promoters to assure a good bond between the lenticular resin and the base film. In a second embodiment, the adhesion promoter has a different characteristic, a release additive, such that once cooled the base film may be stripped from the lenticular film. The invention solves the problem of lamination in higher resolution applications. The lenses must focus at the image surface. In unimproved materials, the tolerances sometimes accumulate during lamination reducing the quality of the image. Since the base film and the lenticular film are subjected to formation concurrently between the nip roll and the engraved molding roll, dimensional variation is substantially keyed to the dimensional stability of the base film. The base film can be coated with a light-sensitive emulsion and the image created photographically. The base film may be polyethylene terephthalate, PET. The lenticular resin may be actinically radiation-cured. The required bilateral stability required for very thin arrays is not addressed in this patent. The base film might be a PET film without the necessary cross linking to protect a very thin lenticular resin from distortion.

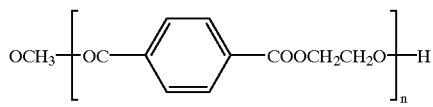

The above is the PET monomer. The dimensional variation referred to in '502 is thickness variation. The concern of thin lenticular arrays is longitudinal and latitudinal variation that results in an array that cannot be registered and aligned. Elements of '502 exist in the instant invention, However, the instant invention directs improvements and presents new alternatives to '502. In one embodiment in '502, the base film is stripped in post-molding processing. No solution to handling thin films prior to adding the planar surface print is suggested.

In U.S. Pat. No. 4,420,527 ('527), the claims are directed to the resulting product, rather than the method of manufacture. The product is produced similarly to '502. A base film that may be PET is used with an adhesion promoter. The pliant lenticular resin is molded by roll with the negative of the desired relief pattern. The base film covers the nip roll during molding. Actinic radiation is used to cross link the lenticular polymer. A photographic emulsion layer is incorporated.

In U.S. Pat. No. 4,414,316 ('316), the claims in '527 are extended to include features taught in '527.

U.S. Pat. No. 5,362,351 ('351) does not mention the above inventions as prior art. Nonetheless, '351 uses and claims a base film with an adhesion layer and the extrusion of the lenticular resin for molding against an engraved roll with counter pressure being applied via a nip roll. The adhesion layer may be applied in a prior step or co-extruded. However, PET film suppliers will supply their films with an adhesive layer if desired. In both, '351 and in '502, the option of separating the molded lenticular film from the base film is presented. There is an assertion in '351 that tandem extrusion lines are frequently employed resulting in inclusion of air bubbles or the like due to the heating and cooling of the product. It is further asserted that biaxially stabilized PET base films are not satisfactory because they are costly. Accordingly, '351 teaches non-oriented polypropylene and non-oriented PET films as base films. It is asserted in '351 that stronger adhesives are possible because the adhesive does not contact chilled rolls that can include the engraved molding roll, the nip roll and subsequent rolls. While true, this is hardly an innovation of '351 since the same attributes exist in the above cited inventions. The printing technology of choice in '351 is gravure printing. It is asserted that intaglio printing of this kind is successful because the molding roll and subsequent gravure printing rolls are precisely aligned because they are manufactured by the same process. However, the results claimed are inconsistent with the objectives of this invention.

U.S. Pat. No. 4,042,569, Heat-setting process for polyester film, can be summarized as an improvement in a two-stage heat-setting process for asymmetrically, biaxially oriented polyester film wherein the film from the second heat-setting stage is heat set a third time and quenched. The starting film can be oriented by a transverse-direction then machine-direction sequence of drawing. Alternatively, the starting film can be oriented by a machine-direction, transverse-direction, and finally, machine-direction sequence of drawing. The film can be machine direction drawn again after the second heat-set stage and relaxed an equal amount after the third heat-set stage. Said film has improved dimensional stability in the transverse direction without a substantial loss in tensile strength at 5% elongation in the machine direction. Starting films with the cited properties are critical to the accomplishments of my invention.

SUMMARY OF THE INVENTION

The objective of my invention is to achieve exceptionally thin optically anisotropic lenticular sheets for the realization of anisotropic visual effects such as three dimensional effects for vertically oriented lenses' axes and the gamut of effects for horizontally oriented lenses' axes such as morph, motion, zoom and others. These new thinner embodiments are consistent with the advances in printing technology that can align and register planar surface print with sufficient detail to present a repertoire of as many as eight images in these extraordinarily thin realizations.

This objective is achieved by an improvement of previous art. The departure from the method of previous inventions consists of the use of a stabilized carrier film. In order to defeat the distortion created by the longitudinal tension effected by the pull rolls, a biaxially oriented heat stabilized carrier film is introduced at one of several appropriate places in the web process. This film is typically from the polyethylene terephthalate, PET family of materials and has been heat treated at temperatures that exceed any temperature encountered in the web process.

In some embodiments, the stabilized base film stays with the product. In these embodiments, said film may be coated at the film manufacturers to adhere to the extruded lenticular resin. It is sometimes convenient to simultaneously extrude a tin adhesion layer on the biaxially stabilized but untreated carrier film. Precision, aligned ink jet printing requires a print surface with the appropriate absorption characteristics for the rheology of the specific inks employed. The surface energy of this back layer is critical. If the surface energy is too high, the ink droplets will form globules that fail penetrate the surface resulting in a smear. If the surface energy is too low, the ink droplets will adsorb and spread out in a dendritic pattern, ruining the inherent resolution capability of the print. Another important characteristic of this back layer is high diffuse reflectivity. The inks are responsible for the color absorption. For example, inks usually consist of yellow (which absorbs blue incident light), cyan (which absorbs red incident light) and magenta (which absorbs green incident light), and sometimes black (which absorbs all wavelengths). The luminance of the reflected light comes only from the visibility-weighted diffuse reflectivity of the back layer. It should be color neutral, white. The critical planar-side ink-receiving layer to match the intended ink can be procured with the base film or introduced in the web process.

In some embodiments, the image is transfer printed on the planar side. With transfer printing, the planar side may be prepared differently. The surface energy of the planar-side film may be treated with a corona to condition the surface to this type of image technology.

In very thin embodiments, it is sometimes impossible to retain the carrier film with the product. In such cases, the adhesion layer is modified to allow the lenticular film separation. Since these are very thin lenticular sheets, it is sometimes necessary to add a handling film to the lens side of the lenticular sheet for handling. After the film is printed, the sheet may be peeled away for viewing of the final product.

In some embodiments, the required relief pattern on the viewer-side of the lenticular array is not moulded by extruding the lenticular resin ahead of the roll that has been engraved with the negative or the desired surface texture. Instead, a novel multilayer film is introduced into web process. The film has two critical layers, a biaxially stabilized, relatively high temperature film and a lenticular resin. The resin is so designed that the required relief pattern can be effected by heating the multilayer film and embossing the multilayer film with an engraved roll. The composite film is heated to effect cross linking of the lenticular polymer. After molding, heat is removed from the composite film to set the relief pattern. The manufacturing step of extruding a lenticular resin is absent in this embodiment. If inkjet printing is desired, an ink-receptive layer may be added. Alternatively, the planar surface may be conditioned with a corona discharge for other imaging techniques.

In further embodiments, the longitudinal stress in the film is further managed by sensing a force that is linearly related to said stress and incorporating the sensor output in a servomechanism to minimize and control said stress. In any of the embodiments described herein, the print receptive layer that may be bonded to the planar side of the film may sometimes be a preprinted film or preprinted paper that is simultaneously bond to said lenticular sheet. In the case of bonding of a preprinted film or sheet, the product may be completed in a single web process.

OBJECTS OF THE INVENTION

The principal object of the invention is to provide a windowpane-shaped device that presents the repertoire of images differently to the right and left eye of the viewer to yield the perception of depth, or to present the standard optical effects of morph, motion, flip or zoom with previously unattainably lower thickness.

Another object of the invention is to provide a method to manufacture previously unattainably thin lenticular sheets with sufficient dimensional stability to register a computer-designed image to effect these optical perceptions.

BRIEF DESCRIPTION OF THE DRAWINGS

The foregoing and other objects will become more readily apparent by referring to the following detailed description and the appended drawing in which:

FIG. 8a is a fragmentary cross section of the newly available, multilayer biaxially stabilized film that is coated with a resin capable of being embossed to form a surface with the desired relief pattern.

FIG. 8b is an extension of the fragmentary cross section of the multilayer film of FIG. 8a that includes an ink-receptive layer.

DETAILED DESCRIPTION

Figure 1:
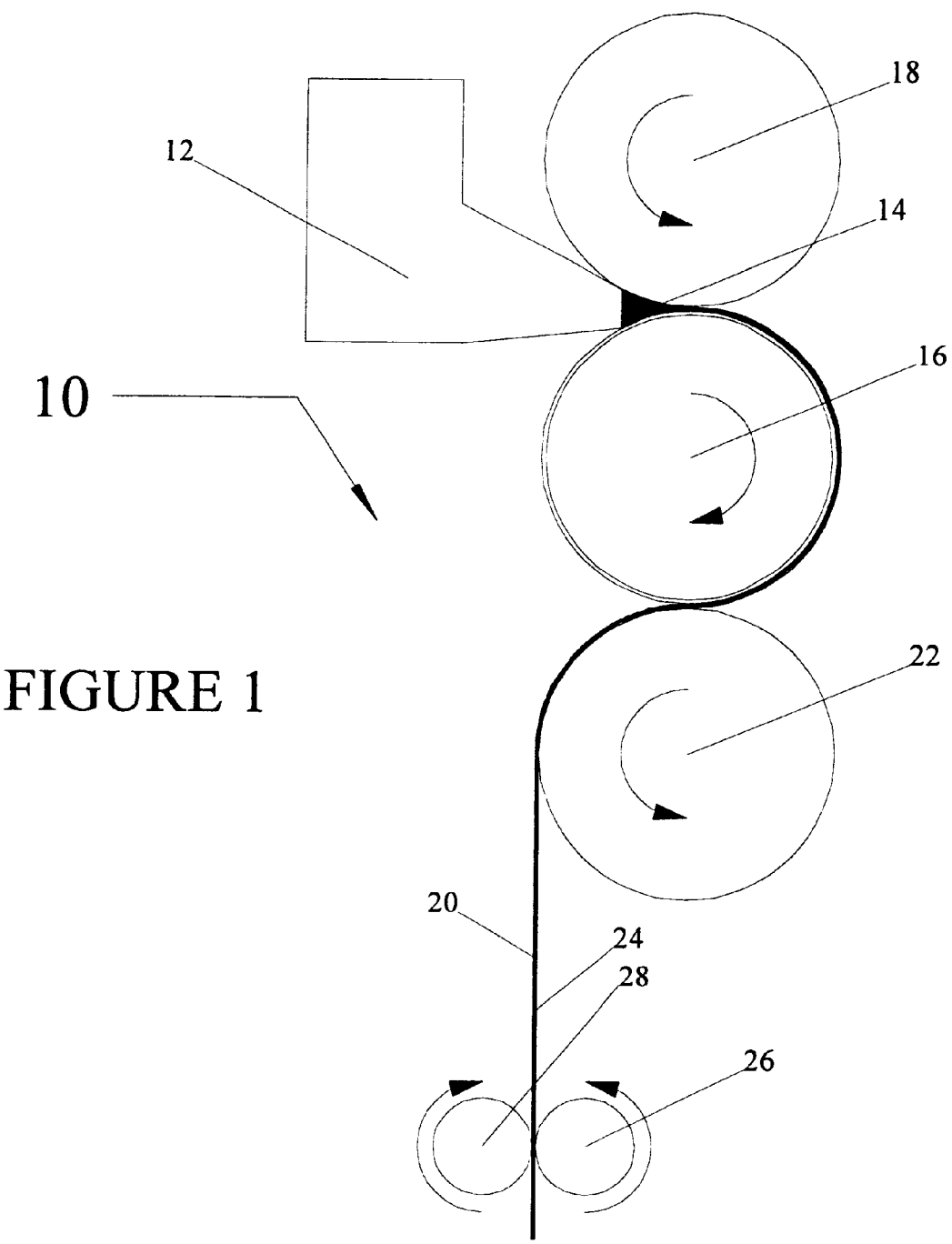
FIG. 1 is a diagrammatic side view of the typical method of formation of a plastic sheet according to prior art.

Referring to FIG. 1, an apparatus for forming a sheet of thermoplastic for subsequent processing into a lenticular array 10 is shown according to prior art. The lenticular resin material 14 is extruded from the die 12, somewhat undersized in width, somewhat oversized in thickness. The lenticular resin material, with moderately low viscosity is forced against the engraved molding roll 16 and nip roll 18. Both rolls are chilled causing heat flow from the material being processed, causing the lenticular material 14 to set up with a relief pattern on the lenticular side 20. An additional roll 22 may be used to allow the material further set and therefore develop resistance to the lateral tension caused by the pull rolls 26 and 28. After the pull rolls, the lenticular material is either spooled onto a take-up winder or cut into sheets. This figure represents the way the majority of lenticular sheets are fabricated today. The usual lenticular sheet materials include polyester, polycarbonate or acrylic. In subsequent steps, the planar side 24 is processed to add a registered and aligned image. An alignment mark, sometimes a missing lens, is molded into the lenticular side in the process.

Figure 2:
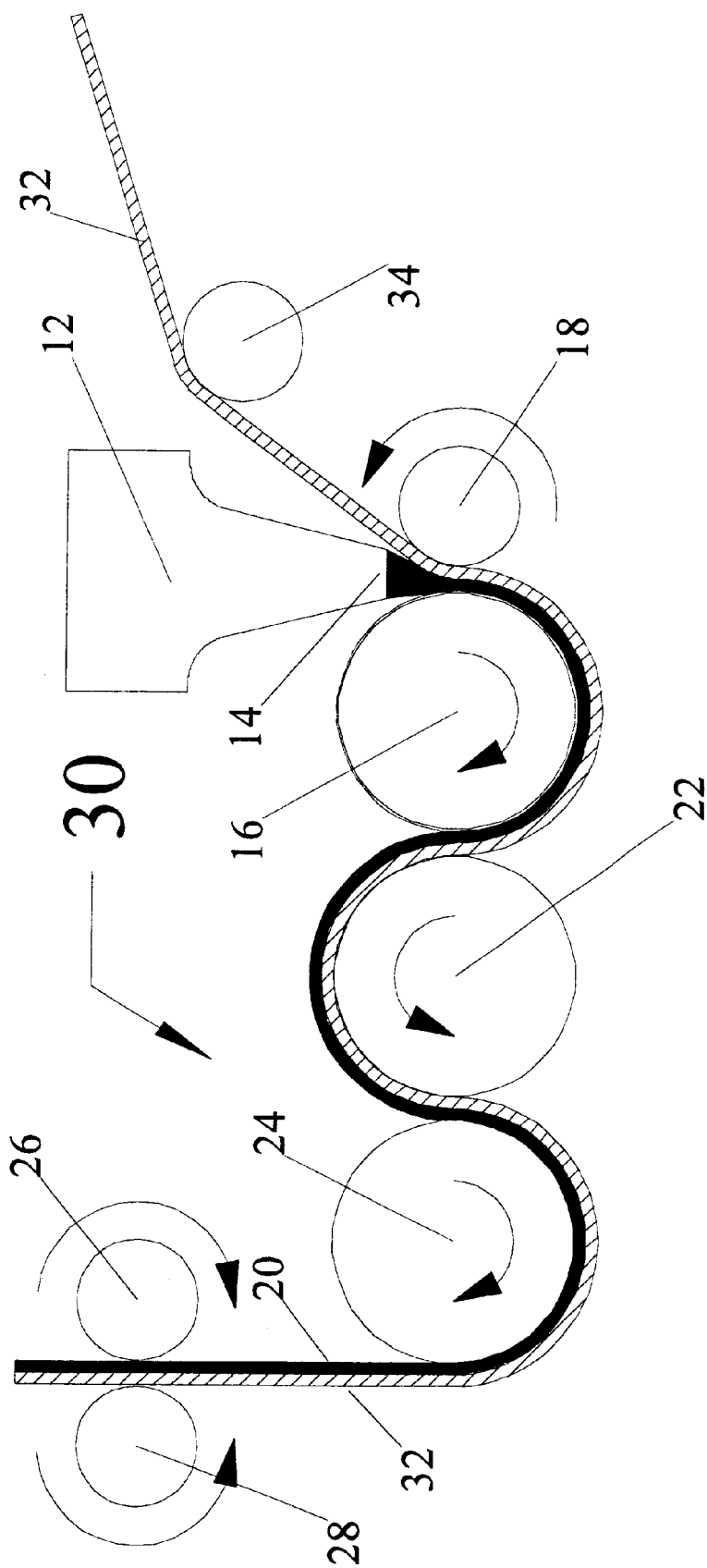
FIG. 2 is a diagrammatic side view of methods cited in related prior art.

Referring to FIG. 2, an apparatus for forming a sheet of thermoplastic for subsequent processing into a lenticular array 30 is shown according to the cited prior art. The lenticular resin material 14 is extruded from the die 12, somewhat undersized in width, somewhat oversized in thickness. A base film 32 that is coated on one side with an adhesion promoter is introduced over idler roll 34. The base film material 32 covers nip roll 18. The lenticular resin material, with moderately low viscosity is forced against the engraved molding roll 16 and nip roll 18, now covered with said base film 32. Both rolls are chilled causing heat flow from the material being processed, resulting in the lenticular material 14 to set up with a relief pattern on the lenticular side 20. Additional rolls 22 and 24 may be used to allow the material further set and therefore develop resistance to the lateral tension caused by the pull rolls 26 and 28. After the pull rolls, the lenticular material is either spooled onto a take-up winder or cut into sheets. This figure represents one of the ways lenticular sheets are fabricated today. The usual lenticular sheet materials include polyester, polycarbonate or acrylic. In subsequent steps, the planar side of the base film 32 is processed to add a registered and aligned image. An alignment mark, sometimes a missing lens, is molded into the lenticular side in the process.

Figure 3:
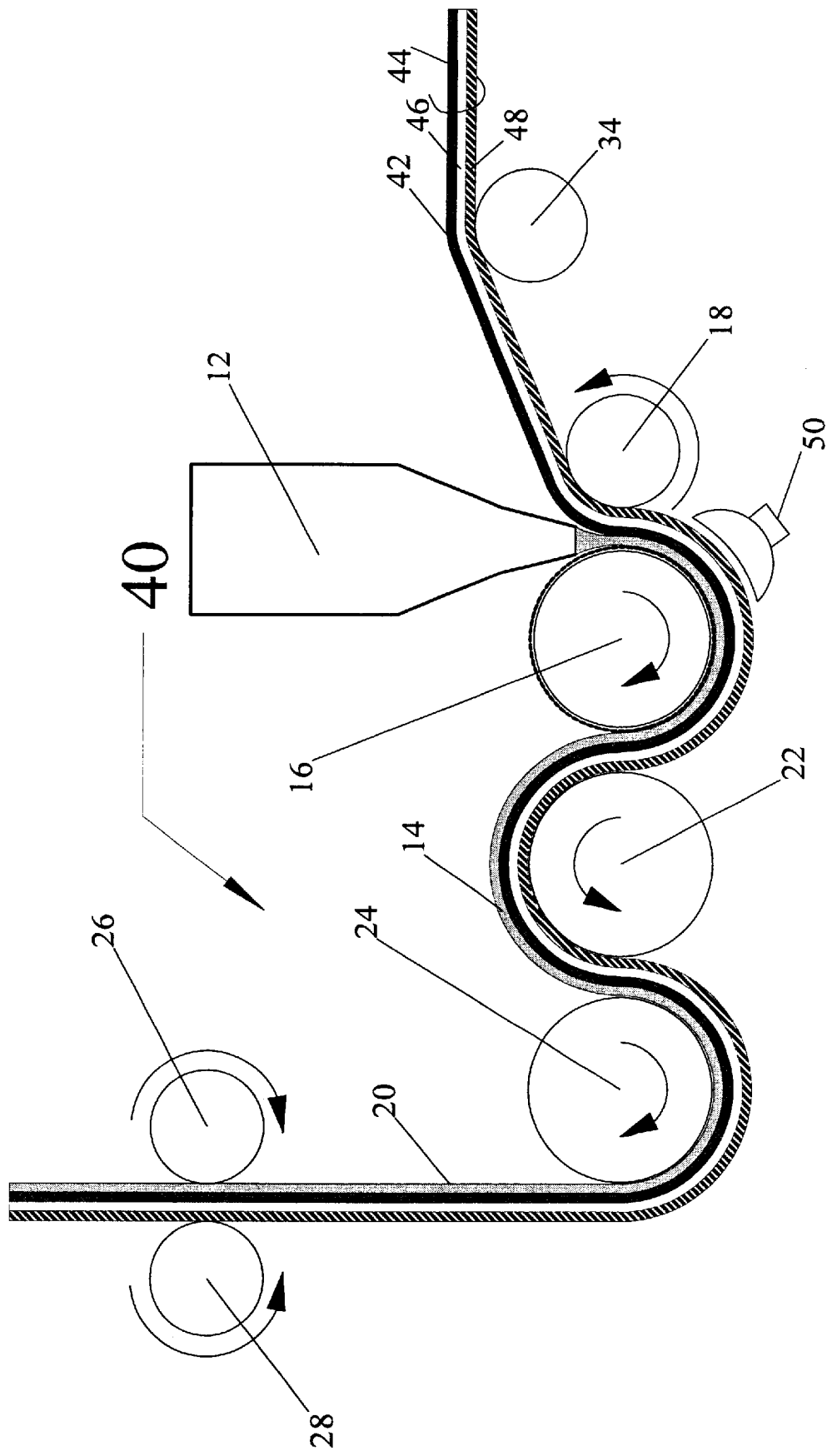
FIG. 3 is a diagrammatic side view of a first embodiment of the methods of this invention.

Referring to FIG. 3, an apparatus for implementing our method for producing an extraordinarily thin sheet of thermoplastic for subsequent processing into a lenticular array 40 is shown according this invention. The lenticular resin material 14 is extruded from the die 12, somewhat undersized in width, somewhat oversized in thickness. A biaxially stabilized base film 46 that is coated on one side with an adhesion promoter 42 (shown with exaggerated thickness for clarity) and an ink-receptive layer 48 is introduced over idler roll 34. The biaxially stabilized base film material 44 covers nip roll 18. The lenticular resin material, with moderately low viscosity is forced against the engraved molding roll 16 and nip roll 18, now covered with said base film 44. Both rolls are chilled causing heat flow from the material being it processed, resulting in the lenticular material 14 to set up with a relief pattern on the lenticular side 20. Optionally, actinic radiation may be employed via ultraviolet lamp 50 to cross link the lenticular resin through the biaxially stabilized, coated base film 44. Additional rolls 22 and 24 may be used to allow the material further set and therefore develop further increase resistance to the lateral tension caused by the pull rolls 26 and 28. After the pull rolls, the lenticular material is either spooled onto a take-up winder or cut into sheets. This figure represents one of the ways extraordinarily thin lenticular sheets may be fabricated according to this invention. The usual lenticular sheet materials include polyester, polycarbonate or acrylic. In subsequent steps, the planar side of the base film 44 is printed with a registered and aligned image. An alignment mark, sometimes a missing lens, is molded into the lenticular side in the process.

Figure 4:
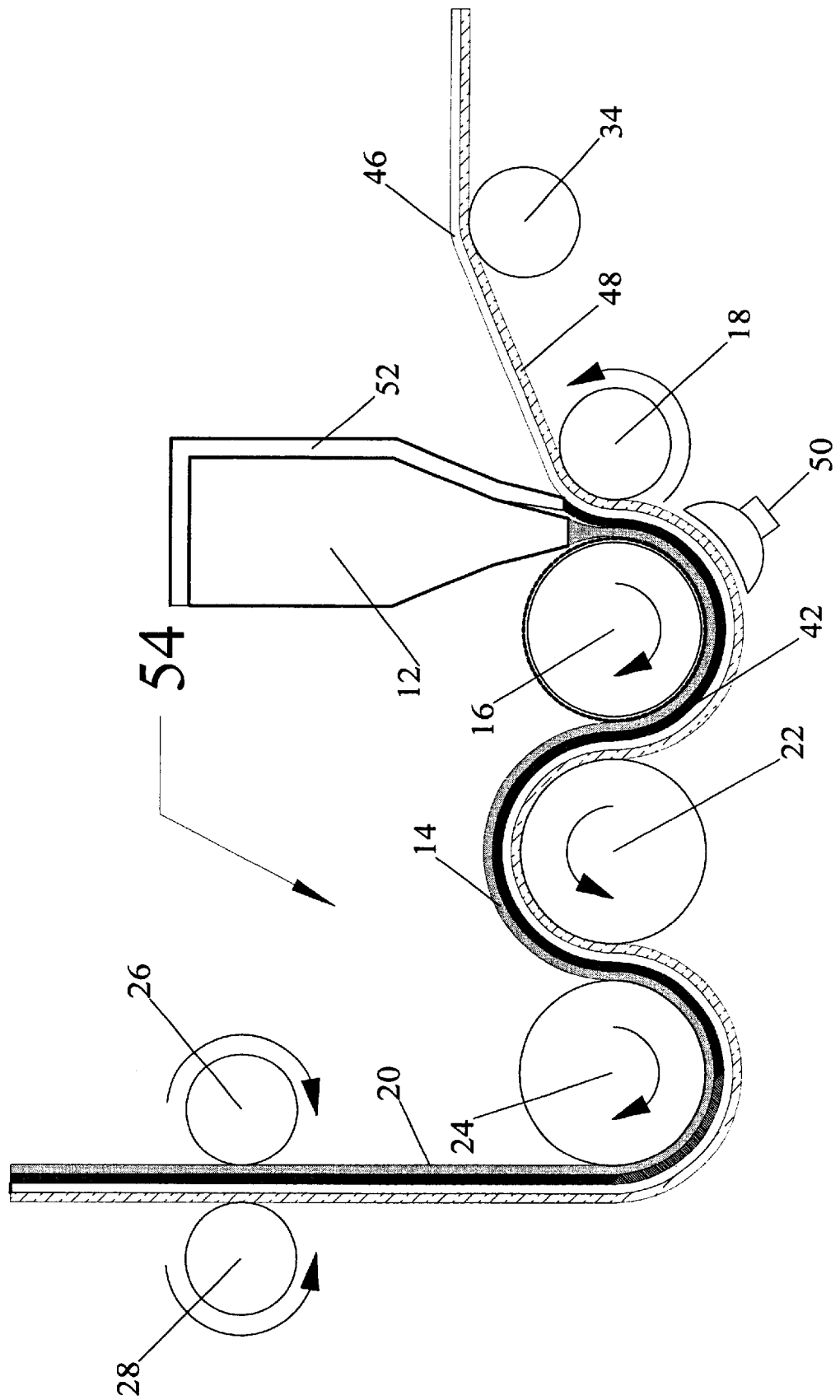
FIG. 4 is a diagrammatic side view of a first embodiment of the methods of this invention with alternate placement of the adhesion promoter.

Referring to FIG. 4, an apparatus for implementing our method for producing an extraordinarily thin sheet of thermoplastic for subsequent processing into a lenticular array 54 is shown according this invention. The web process differs from that described under FIG. 3, only in that the biaxially stabilized base film 46 is not coated with an adhesion promoter before delivery to the web process. Instead, the adhesion promoter 42 is simultaneously extruded onto the biaxially stabilized base film 46 just ahead of the extrusion of the lenticular resin 14. This option allows some variation in material selections versus the method described under the description of FIG. 3.

Figure 5:
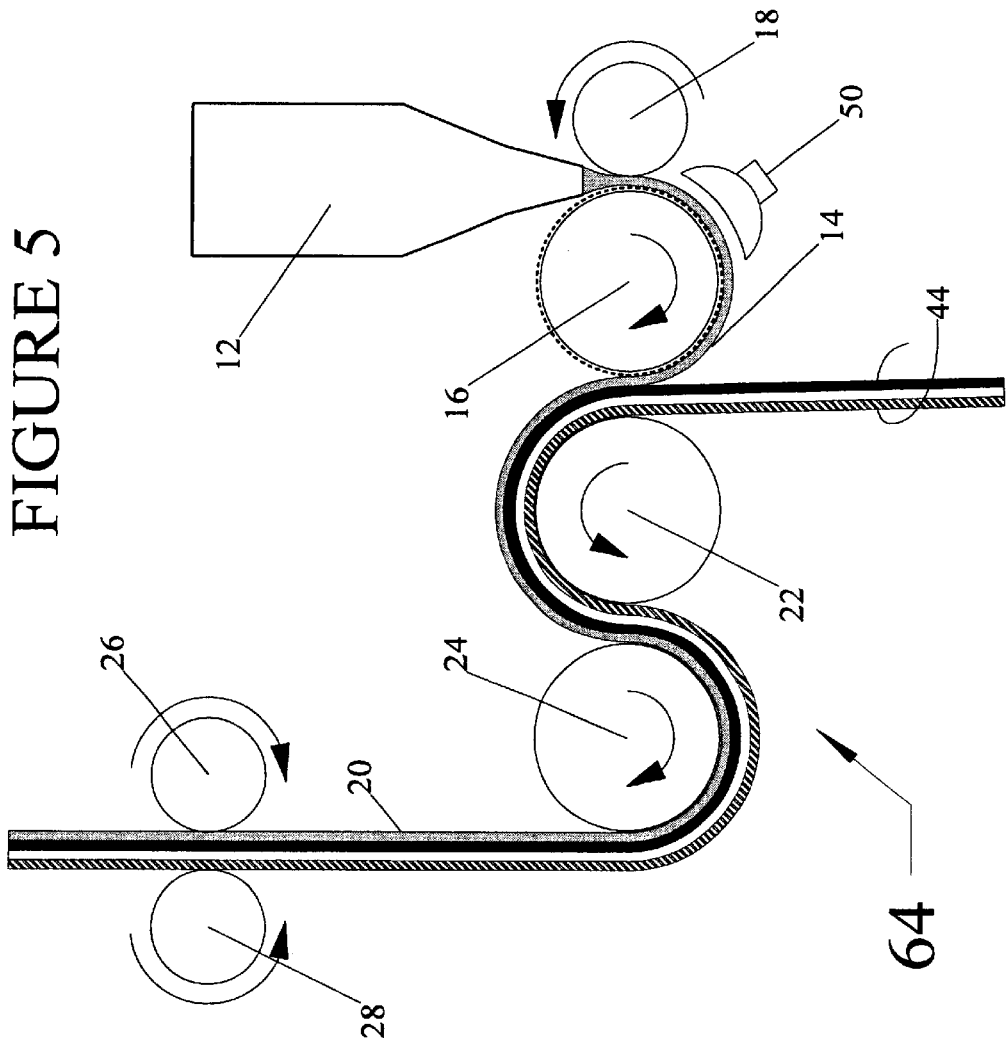
FIG. 5 is a diagrammatic side view of a first embodiment of the methods of this invention with the stress-guarding biaxially stabilized film, introduced after molding of the lenticular resin.

Referring to FIG. 5, an apparatus for implementing our method for producing an to extraordinarily thin sheet of thermoplastic for subsequent processing into a lenticular array 64 is shown according this invention. The web process differs from that described under FIG. 3, in that lenticular resin is initially processed as it is conventionally done for films of ordinary dimensions. See FIG. 1. In order to solve the longitudinal and latitudinal distortion that would otherwise result from the pull rolls 26 and 28, a biaxially stabilized base film 44 is delivered to the web process as described under FIG. 3 with both adhesion promoter 42 and ink receptor 48. The film is bonded to the already molded lenticular resin by using roll 22 as a nip roll. Since the adhesive layer now contacts relatively cool lenticular resins, a different class of adhesive may be used. The lenticular resin is optionally cross linked using actinic radiation as described under FIGS. 3 and 4.

Figure 6:
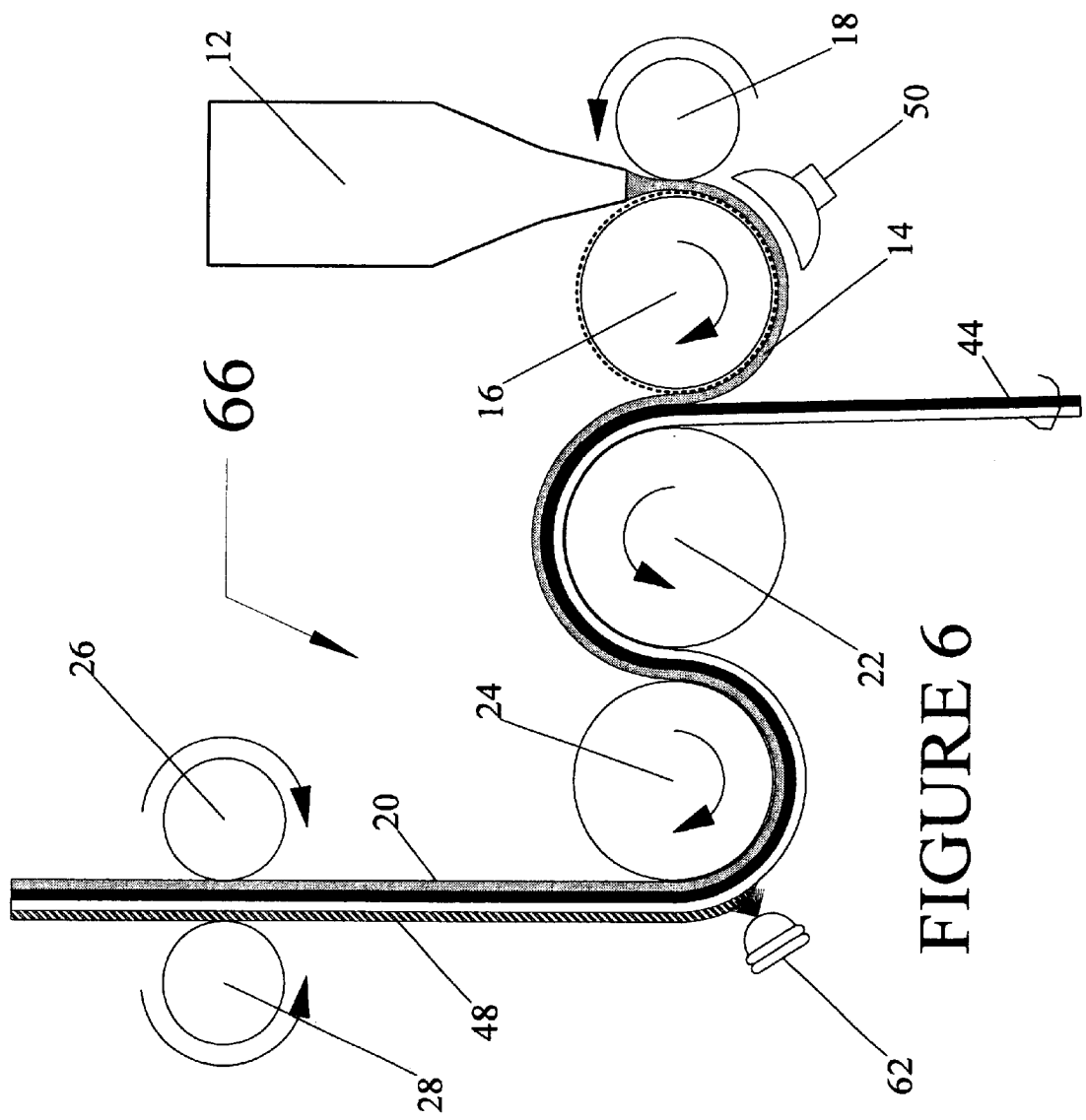
FIG. 6 is a diagrammatic side view of a first embodiment of the methods of this invention with the stress-guarding biaxially stabilized film, introduced after molding of the lenticular resin and an ink-receptive layer or a corona discharge surface conditioning step is introduced later in the web process.

Referring to FIG. 6, an apparatus for implementing our method for producing an extraordinarily thin sheet of thermoplastic for subsequent processing into a lenticular array 66 is shown according this invention. The web process differs from that described under FIG. 5, in that the biaxially stabilized base film 44 is procured for the web process without a treatment or layer for accepting printing. The treatment or layer can be incorporated into the web process. For example, element 62 could be a device for applying a layer for accepting ink jet printing. Element 62 may be a spray apparatus that applies the ink-receptive layer 48. This option exists for the previously configured processes as well. If an ink-receptive layer 48 is desired, it may be sprayed on, wherein element 62 represents a spray head, or applied by other techniques known in the art. In some cases, no material is added, but element 62 represents a surface conditioning means, for example, a corona discharge means, and 48 represents a surface-treated PET film rather than a layer. In some cases, neither an ink-receptive layer nor a conditioned surface is necessary and no further process steps are taken.

Figure 7:
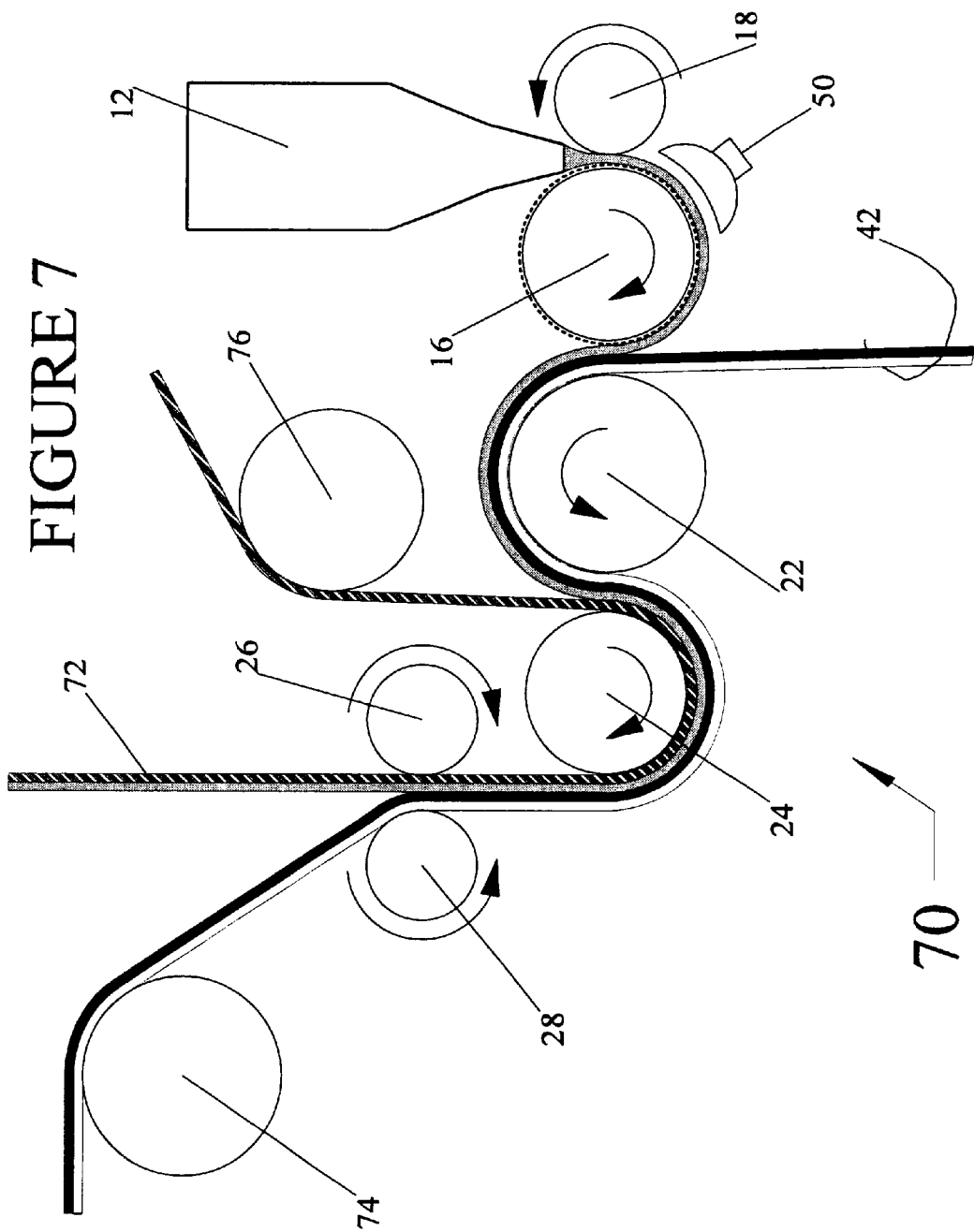
FIG. 7 is a diagrammatic side view of a first embodiment of the methods of this invention with the stress-guarding biaxially stabilized film, introduced after molding of the lenticular resin and the stabilized film finally stripped from the produce and a handling film added.

Referring to FIG. 7, an apparatus for implementing our method for producing an extraordinarily thin sheet of thermoplastic for subsequent processing into a lenticular array 70 is shown according this invention. The web process differs from that described under FIG. 6, in that the biaxially stabilized base film is procured with the adhesive layer 42 modified to release the lenticular resin after it has performed the critical function of bearing the longitudinal stress from pull rolls 26 and 28. Upon exiting said pull roll, the biaxially stabilized base film is stripped from the lenticular film and directed over roll 74. In this embodiment, the thin lenticular film is intended for application to an underlying image by methods other than ink jet printing. So that the film can be handled in subsequent processing, a handling film 72 is weakly bonded to the lenticular film 14. This is accomplished by pressure between rolls 24 and 22. Roll 24 acts as a nip roll for this process step. Said handling film is presented to the web process via roll 76. This option exists for the previously configured processes as well. In this embodiment, the thermoplastic family may include polyolefin, urethane, polyvinyl chloride with the lens-side adhered to a handling film that is removed after the lenticular sheet is laminated to the computer-dissected image, whereupon the handling film is stripped.

FIG. 8a shows a fragmentary cross section of a newly-available resin-coated, biaxially stabilized polymer film such as may be used in the invented process. The film 80 consists of a reformable layer 82 bonded to a biaxially stabilized base film 84. In manufacturing, the multilayer film is heated to soften and induce cross linking of the reformable layer 82. The desired relief pattern is then imprinted by embossing. The resin is then cured by either extracting heat or exposing the film to actinic radiation. There may be an adhesion promoter 81, shown more to scale in this cross section.

FIG. 8b shows a fragmentary cross section of the film of FIG. 8a, with a photo-receptive layer incorporated thereon. In this variation, the biaxially stabilized film 84 is enhanced by adding an ink-receptive layer 86 to the multilayer film of FIG. 8a. The overall thickness of the film (the sum of the thicknesses of layers 81, 82, 84 and 86) is in the range of 0.002-inches to 0.012-inches. The purposes of each layer are summarized in Table 1.

TABLE 1

| Layer Number | Purpose | Always Included? |
|---|---|---|
| 81 | Promotes adhesion between layers 82 and 84 | No |
| 82 | Embossed to form the required lenticular pattern | Yes |
| 84 | Biaxially stabilized film to maintain dimension under longitudinal stress | Yes |
| 86 | 1. Ink receptive layer 2. Surface conditioning for subsequent image forming | No |

Figure 9:
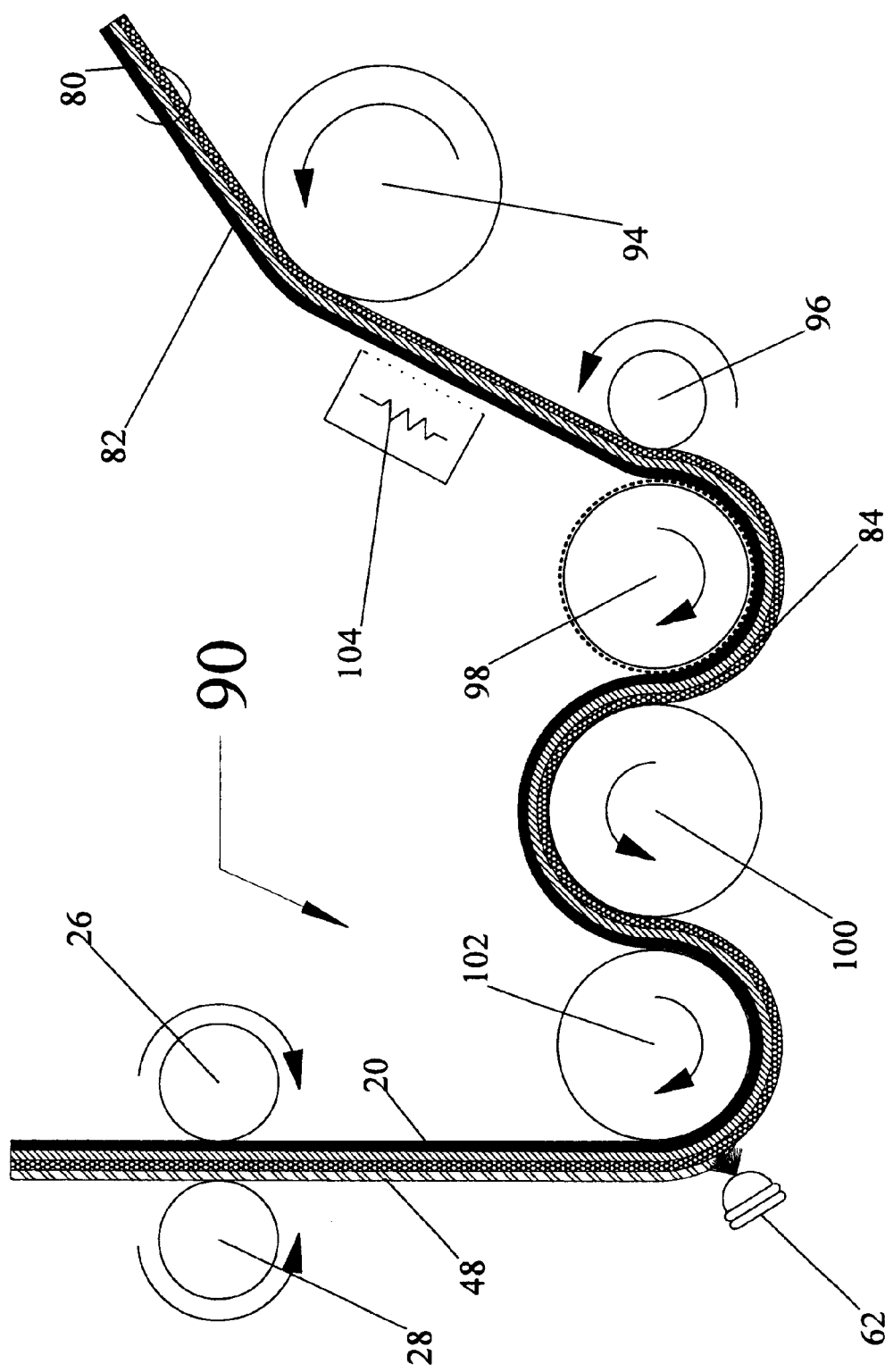
FIG. 9 is a diagrammatic side view of an embodiment of the methods of this invention with the stress-guarding biaxially stabilized film that is coated with a resin capable of embossing to form a surface with the desired relief pattern.

FIG. 9 shows a diagrammatic view of some aspects of the embossing methods 90 that may be used to form an extraordinarily thin lenticular film. The multilayer film 80 is introduced over idler roll 94. Said layer may be heated by heater 104 to soften the reformable layer prior to the embossing step. The embossing takes place by pressing the film 80 against roll 98 that has been engraved with the negative of the desired relief pattern, using pressure from nip roll 96. In some cases the nip roll 96 and/or the embossing roll 98 may be heated since there is a trade off between reformable layer 82 hardness and the required pressure between nip roll 96 and embossing roll 98 needed to effect the required relief pattern. The reformable layer with the incorporated relief pattern is set against the biaxially stabilized layer 84 by removing heat from the material by chilling rolls 100 and 102 in some cases. In some cases, the film 80 is supplied with ink-receptive layer 48 incorporated thereon as shown in FIG. 3. In other cases, the ink-receptive layer 48 may be applied after the lenticular film fabrication by spray means 62 or other coating means known in the art. In some cases, element 62 represents a surface conditioning means such as corona discharge means and layer 48 represents the biaxially stabilized PET film with surface conditioning for subsequent image emplacement technology. The film is extracted from the web process with pull rolls 28 and 29 as in the extrusions methods. The longitudinal stress cannot distort the lenticular layer 82 since the biaxially stabilized film 84 is bonded thereto and resists such distortion.

Figure 10:
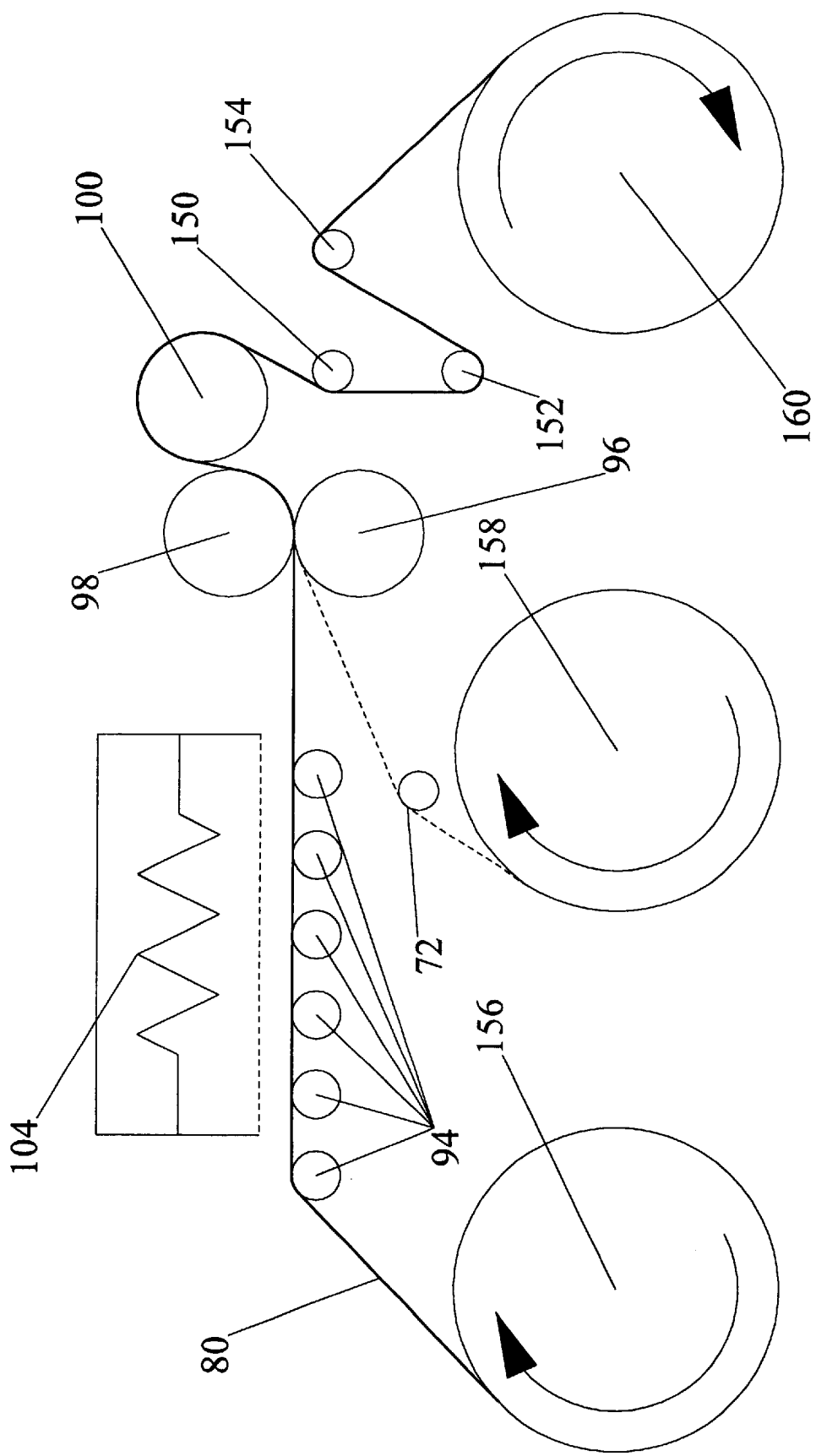
FIG. 10 is a diagrammatic side view of another embodiment of the methods of this invention with the stress-guarding biaxially stabilized film that is coated with a resin capable of embossing to form a surface with the desired relief pattern further including means to manage the longitudinal stress in said film via a servomechanism.

FIG. 10 shows another embodiment of the invention. The multilayer film 80 is delivered to the process on unfinished goods spool 156 and as previously described, introduced over idler rolls 94. The reformable layer is heated by heater 104 to soften said layer prior to the embossing step. The embossing takes place by pressing the film 80 against roll 98 that has been engraved with the negative of the desired relief pattern, using pressure from nip roll 96. In this embodiment the nip roll 96 and the embossing roll 98 are chilled to remove heat and set the pattern. The reformable layer with the incorporated relief pattern is further set against the biaxially stabilized film by additionally removing heat via chilling roll 100. The take-up spool 160 acts as the pull rolls in this embodiment. Longitudinal stress is further managed by measuring the upward force on roll 152 and/or the downward force on roll 154. Such force may be measured by incorporating a strain gauge in the appropriate vertical mounting member, not shown. The vertical position of roll 152 and/or roll 154 may be varied in a servomechanism to minimize and control the value of the longitudinal stress as the effective diameter of the take-up spool 160 increases with the amount of finished goods contained thereon. For example, the vertical mounts on roll 152 and/or roll 154 may be a rack gear driven by a pinion gear driven by a stepper motor according to the strain measured. The servomechanism is stabilized by known means to prevent position variation with no input change.

Optionally, handling film 72 may be introduced from spool 158. The film may be ethylene vinyl acetate. Alternatively, film 72 may be a print-receptive film. In a further alternative case, film 72 may be preprinted with the computer-generated image whereby the finished goods on take-up spool 160 have the repertoire of images in place thus eliminating subsequent image emplacement operations.

SUMMARY OF THE ACHIEVEMENT OF THE OBJECTS OF THE INVENTION

From the foregoing, it is readily apparent that I have invented method to provide a device that presents the repertoire of images differently to the right and left eye of the viewer to yield the perception of depth, or to present the standard optical effects of morph, motion, flip or zoom with previously unattainably thin sheets, and additionally I have invented a method to manufacture previously unattainably thin lenticular sheets with sufficient dimensional stability to register a computer-designed image to effect these optical perceptions.

It is to be understood that the foregoing description and specific embodiments are merely illustrative of the best mode of the invention and the principles thereof, and that various modifications and additions may be made to the apparatus by those skilled in the art, without departing from the spirit and scope of this invention which is intended to be limited only by the scope of the appended claims.

What is claimed is:

1. A method for fabricating an extraordinarily thin transparent sheet with anisotropic optical properties comprising the steps of:

(a) extruding a layer of resin material from a die;

(b) winding said resin around a molding roll having a surface engraved with the negative form of a lenticular relief pattern to mold said lenticular relief pattern into said resin;

(c) compressing said resin between said molding roll and a nip roll, thereby molding a lenticular relief pattern into said resin;

(d) bonding said resin to a bilaterally stabilized base film; and (e) passing said bonded resin and base film around at least one pull roll; whereby said bilaterally stabilized base film prevents longitudinal stress during subsequent process steps from distorting the lenticular relief pattern molded into said resin.

2. A method according to claim 1, wherein said bonding of said resin to said base film occurs before said molding of said lenticular relief pattern into said resin.

3. A method according to claim 2 wherein a first surface of said bilaterally stabilized base film is coated with an adhesion promoter prior to said bonding step.

4. A method according to claim 3, further comprising the step of coating a second surface of said base film with an ink-receptive layer prior to said molding step.

5. A method according to claim 3, further comprising the step of coating a second surface of said base film with an ink-receptive layer after said molding step.

6. A method according to claim 3, further comprising the step of setting and curing said resin by removing heat from said resin by contact with at least one chilled roll, after molding of the lenticular relief pattern.

7. A method according to claim 3, further comprising the step of setting and curing said resin by cross-linking the polymer using actinic radiation, after molding of the lenticular relief pattern.

8. A method according to claim 3, further comprising the step of conditioning the surface of said base film for the reception of an image.

9. A method according to claim 3, further comprising the step of stripping said base film from said resin, after said bonded base film and resin pass around said at least one pull roll.

10. A method according to claim 9, furthers comprising the step of weakly bonding a handling film to said resin.

11. A method according to claim 2, further comprising the step of extruding an adhesive between said base film and said resin.

12. A method according to claim 11, further comprising the step of coating said base film with an ink-receptive layer on the surface opposite the lenticular surface prior to molding.

13. A method according to claim 11, further comprising the step of coating said base film with an ink-receptive layer on the surface opposite the lenticular surface after molding.

14. A method according to claim 11, further comprising the step of setting and curing said resin by passing said resin over chilled rolls, after molding of the lenticular relief pattern.

15. A method according to claim 11, furthers comprising the step of setting and curing said resin by cross-linking the polymer using actinic radiation, after molding of the lenticular relief pattern.

16. A method according to claim 11, further comprising the step of conditioning the surface of said base film for the reception of an image.

17. A method according to claim 11, further comprising the step of stripping said base film from said resin, after said bonded base film and resin pass around said at least one pull roll.

18. A method according to claim 17, further comprising the step of weakly bonding a handling film to said resin.

19. A method according to claim 1, wherein said bonding of said resin to said base film occurs after said molding of said lenticular relief pattern into said resin.

20. A method according to claim 19 wherein a first surface of said bilaterally stabilized base film is coated with an adhesion promoter.

21. A method according to claim 20, further comprising the step of coating a second surface of said base film with an ink-receptive layer prior to said molding step.

22. A method according to claim 2 1, fiter comprising the step of setting and curing said resin by passing said resin over chilled rolls, after molding of the lenticular relief pattern.

23. A method according to claim 21, further comprising the step of setting and curing said resin by cross-linking the polymer using actinic radiation, after molding of the lenticular relief pattern.

24. A method according to claim 20, further comprising the step of coating a second surface of said base film with an ink-receptive layer after said molding step.

25. A method according to claim 24, further comprising the step of setting and curing said resin by passing said resin over chilled rolls, after molding of the lenticular relief pattern.

26. A method according to claim 24, further comprising the step of setting and curing said resin by cross-linking the polymer using actinic radiation, after molding of the lenticular relief pattern.

27. A method according to claim 20, further comprising the step of conditioning the surface of said base film for the reception of an image.

28. A method according to claim 27, further comprising the step of setting and curing said resin by passing said resin over chilled rolls, after molding of the lenticular relief pattern.

29. A method according to claim 27, further comprising the step of setting and curing said resin by cross-linking the polymer using actinic radiation, after molding of the lenticular relief pattern.

30. A method according to claim 20, farther comprising the step of stripping said base film from said resin, after said bonded base film and resin pass around said at least one pull roll.

31. A method according to claim 30, further comprising the step of weakly bonding a handling film to said resin.

32. A method for fabricating an extraordinarily thin transparent sheet with anisotropic optical properties comprising:
(a) procuring a multilayer polymer laminate wherein at least one layer is a biaxially stabilized base film and at least a second layer is a reformable polymer;
(b) winding said laminate around a molding roll having a surface engraved with the negative form of a lenticular relief pattern;
(c) compressing said laminate between said molding roll and a nip roll such that said second layer of said laminate encounters the surface of said molding roll, thereby molding a lenticular relief pattern into said second layer; and,
(d) passing said bonded resin and base film around at least one pull roll; whereby said bilaterally stabilized base film prevents longitudinal stress during subsequent process steps from distorting the lenticular relief pattern molded into said resin.

33. A method according to claim 32, further comprising the steps of:
(a) heating said second layer of reformable polymer prior to molding said second layer, and
(b) setting and curing said second layer by chilling said layer after molding the lenticular relief pattern.

34. A method according to claim 33, further comprising the steps of:
(a) measuring the longitudinal stress in said polymer laminate; and to (b) controlling said stress via a servomechanism, whereby the lens distortion due to said stress in minimized.

35. A method according to claim 34, further comprising the step of bonding a film containing a preprinted image to the planar side of said polymer laminate.

36. A method according to claim 32, further comprising the step of coating the surface of said first layer of said laminate with an ink-receptive layer prior to said molding step.

37. A method according to claim 32, further comprising the step of coating the surface of said first layer of said laminate with an ink-receptive layer after said molding step.

38. A method according to claim 32, further comprising the step of setting and curing said second layer by cross-linking said second layer using actinic radiation, after molding of the lenticular relief pattern.

39. A method according to claim 32, further comprising the step of stripping said base film from said second layer, after said bonded base film and resin pass around said at least one pull roll.

40. A method according to claim 37, further comprising the step of weakly bonding a handling film to said second layer.

41. An extraordinarily thin, transparent, windowpane-shaped device with anisotropic optical properties for multiple image visual effects that depend on the viewer's angle of regard which comprises:

(a) a bilaterally stabilized base film layer;

(b) a molded lenticular surface having lenses with substantially circular cross section adhesively affixed to a first side of said base film; and (c) a computer-generated image that is registered to said lenticular surface and affixed to the second side of said bilaterally stabilized base film.

42. A device according to claim 41 wherein the bilaterally stabilized base film consists of a polyethylene terephthalate polymer.

43. A device according to claim 41 wherein said molded lenticular material consists of thermoplastic selected from the group consisting of polyesters, polycarbonates and acrylics.

44. An extraordinarily thin, transparent, windowpane-shaped device with anisotropic optical properties for multiple image visual effects that depend on the viewer's angle of regard which comprises:

(a) a molded lenticular surface having lenses with substantially circular cross section manufactured by the method of claim 37, and (b) a computer-generated image that is registered to said lenticular surface and affixed to the second side of said bilaterally stabilized base film.

45. A device according to claim 44 wherein said molded lenticular material consists of thermoplastic selected from the group consisting of polyolfins, urethanes, and polyvinyl chlorides.

* * * * *